United States Patent [19]

Harding

[11] Patent Number: 4,599,992
[45] Date of Patent: Jul. 15, 1986

[54] ANTICIPATORY THERMOSTAT WITH RESET FOR DOMESTIC HYDRONIC BOILER CONTROL

[76] Inventor: John W. Harding, 1029 Sunset Dr., Blue Bell, Pa. 19422

[21] Appl. No.: 771,126

[22] Filed: Aug. 30, 1985

[51] Int. Cl.⁴ .............................................. F24H 1/00
[52] U.S. Cl. .................... 126/351; 219/330; 219/309; 219/310; 219/292; 219/282; 236/20 R; 236/47; 236/91 F X; 236/22; 236/37; 237/8 A; 236/21 B; 236/91 F
[58] Field of Search ........................ 126/351, 361, 362; 219/330, 508, 282, 297, 310, 330, 309; 236/47, 20 R, 21 B, 22, 37, 47, 91 F X; 237/8 A, 71

[56] References Cited

U.S. PATENT DOCUMENTS

| | | | |
|---|---|---|---|
| 4,166,944 | 9/1979 | Scott | 219/330 |
| 4,354,094 | 10/1982 | Massey et al. | 219/306 |
| 4,371,779 | 2/1983 | Maynard et al. | 219/328 |
| 4,413,775 | 11/1983 | Scott | 236/20 R |
| 4,501,261 | 2/1985 | Tsutsui et al. | 126/351 |
| 4,535,931 | 8/1985 | Bartok et al. | 126/351 X |

FOREIGN PATENT DOCUMENTS 104043 6/1982 Japan ................................ 236/20 R Primary Examiner—Randall L. Green
Attorney, Agent, or Firm—Wenderoth, Lind & Ponack

[57] ABSTRACT

A hot water heating system for a building has a hot water storage tank, a combustor, a burner for firing the combustor, a plurality of radiators, a pump for circulating hot water to and from the plurality of radiators, a first thermostat for measuring the temperature of the hot water in the storage tank and for controlling the burner in response to such temperature, a heat exchanger in the storage tank, a cold water inlet line, and a hot water outlet line. The improvement comprises a cold water heating element arranged around a portion of the inlet line, a temperature sensing element arranged in close proximity to the heating element, and a second thermostat for anticipatorily controlling firing of the combustor by the burner via the first thermostat. Also, the second thermostat, via an electrical line, shuts off the pump when the second thermostat is causing firing of the combustor by the burner.

6 Claims, 8 Drawing Figures

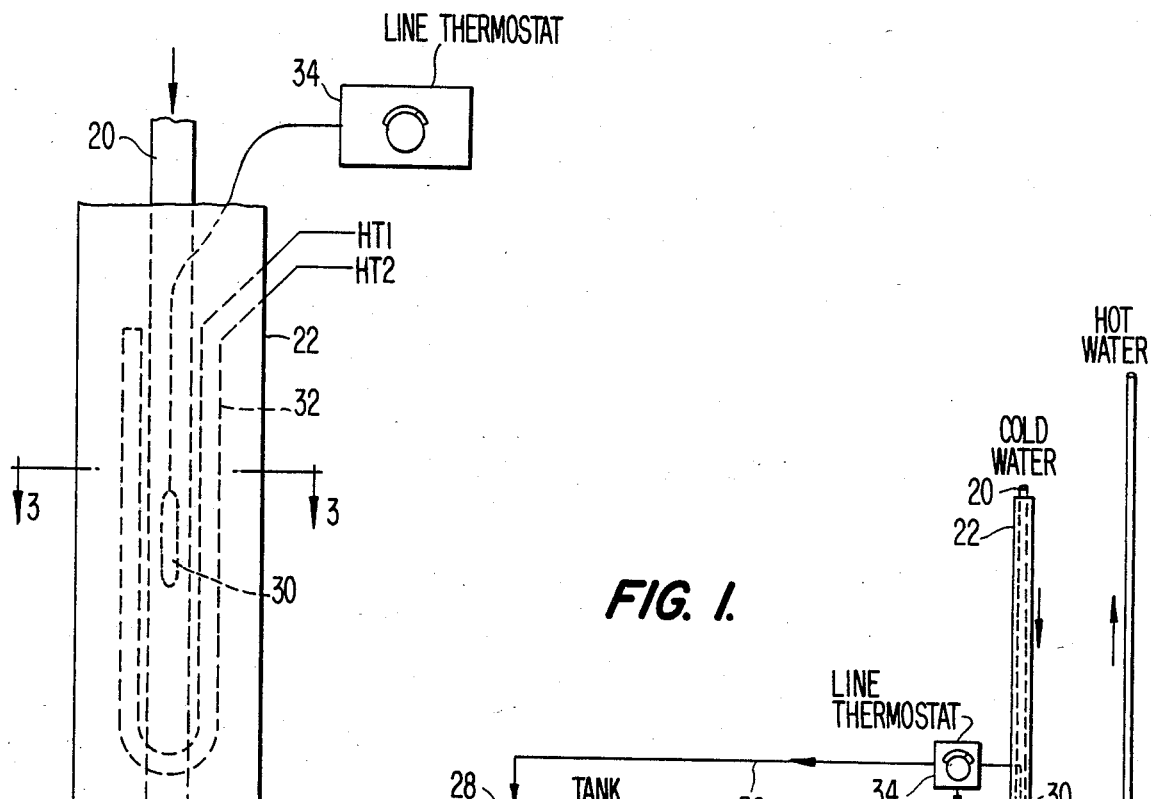
FIG. 2.
FIG. 1.
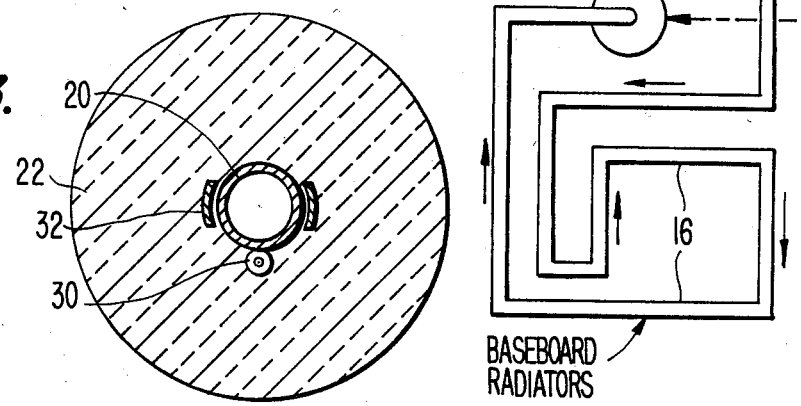
FIG. 3.

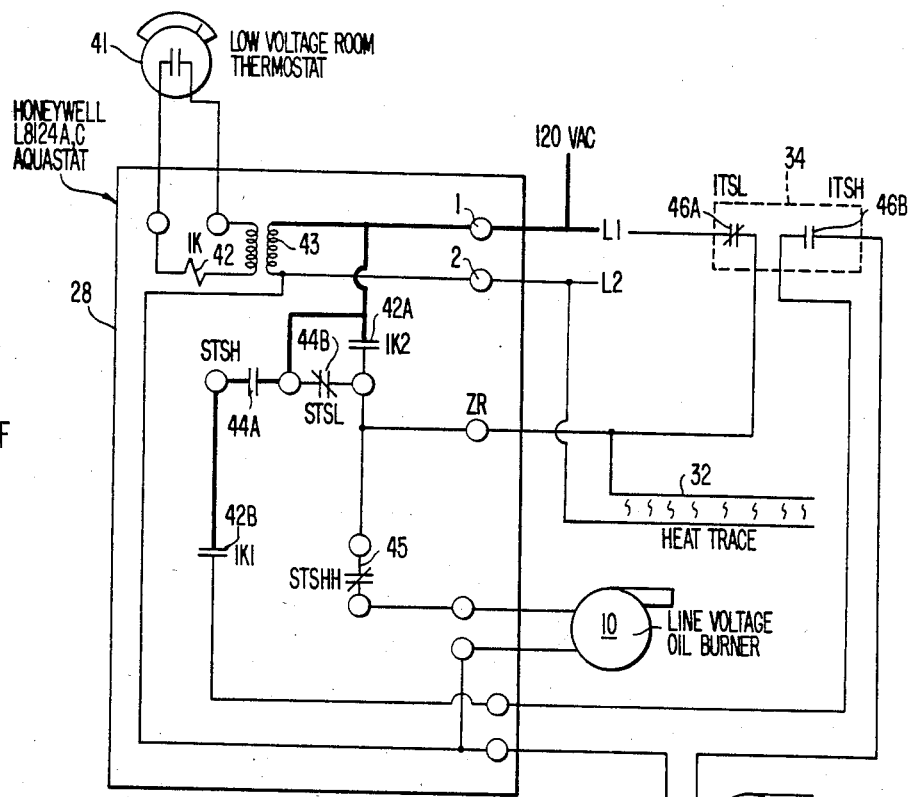
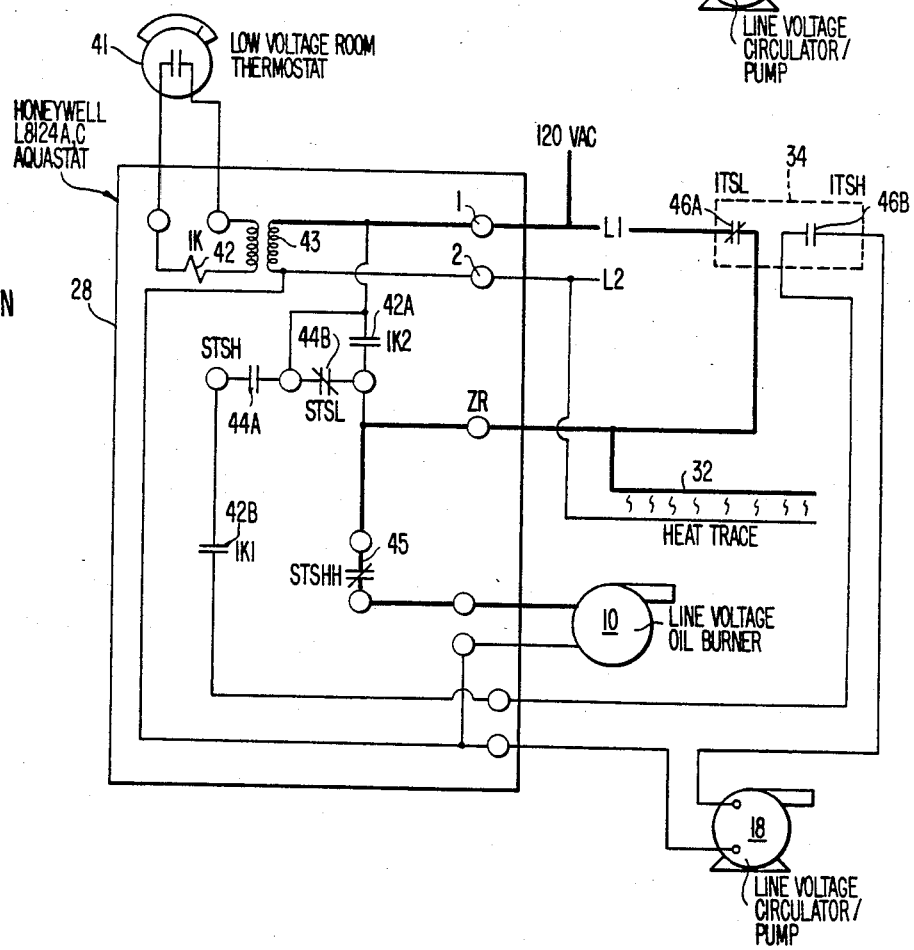

CONDITIONS:
ROOM COLD
NO DOMESTIC
WATER USE
BOILER HOT
BURNER ON
CIRCULATOR ON
REHEATER ON

CONDITIONS:
ROOM COLD
DOMESTIC WATER ON
BOILER HOT
BURNER ON
CIRCULATOR OFF
REHEATER ON

ANTICIPATORY THERMOSTAT WITH RESET FOR DOMESTIC HYDRONIC BOILER CONTROL

BACKGROUND OF THE INVENTION

1. Field of the Invention

The present invention relates to automatic temperature regulators, particularly in boilers and other closed fluid heaters with flow controlled therein.

2. Description of the Prior Art

Oil-fired water heating systems are primarily installed to provide required heating of the space within a house by use of hot water-filled radiators. The installation of a water coil immersed in a heat exchange relationship with water being heated inside a storage tank provides a secondary function of heating water for domestic uses, such as bathing and cleaning.

Such a method of heating water for domestic uses is the least desirable from the standpoint of quality and efficiency but continues to be used in older houses because a large amount of capital is already invested in the oil-fired boiler. Such a boiler has a storage tank for supplying hot water to radiators for heating the entire space within the house. The quality of the hot water for domestic uses varies widely during usage due to large swings in temperature and, thus, is quite substandard. This poor quality occurs because, as implied above, the boiler control systems presently used in older house heaters are sensitive only to large changes in the temperature of the water in the boiler for space heating and not to changes in the temperature of the water in the heat exchanger for domestic uses.

The method of boiler control presently used in many house heaters provides three basic control points. First, there is a high shutoff point which limits the maximum water temperature to a safe value to avoid overpressurization of the boiler and so that scalding is avoided. Second, there is a normal high temperature shutdown point which normally stops the firing of the boiler when the water reaches an upper desired storage temperature. However, in many new control systems, the temperature of the water in the boiler is allowed to exceed this point whenever the boiler is supplying hot water for heating space in the house via the radiators. Nevertheless, the maximum temperature attainable still does not exceed the high limit shutoff point. Third, there is a low temperature start-up point which begins firing of the boiler at the lowest temperature at which water may be satisfactorily used for domestic purposes.

In all cases, boiler control by thermostats, such as capillary tubes for sensing temperature, even in the newest house heating systems, is nonresponsive to and grossly inadequate for the requirements of water usage for domestic purposes.

There are several reasons why the current burner controls are disadvantageous. First of all, the prior art controls require the temperature of all water inventoried in the boiler to fall to the low temperature start-up point before the tank thermostat commences firing of the burner. This arrangement means that the burner must heat up the entire inventory of water contained in the jacket in order to simply raise the temperature of the water being drawn through the heat exchanger for domestic use. Thus, such an arrangement unnecessarily delays the response of the burner and, consequently, results in wide temperature fluctuations and slow boiler recovery.

A second reason why the current burner controls are disadvantageous is that at least three different practices are used in an attempt to alleviate the problem of the boiler not maintaining the temperature of the water at a satisfactorily high degree during usage for domestic chores. Unfortunately, each of these three practices has a definitely counterproductive aspect.

The first of these practices is increasing the size of the boiler so that there is a larger amount of water in inventory at all times, thus ostensibly making more hot water available for a longer continuous period of time. However, the drawback to this practice is that more water is used for domestic purposes at a poor quality for a longer time before the tank thermostat turns on the burner. Ideally, the water in the boiler should represent a heat source in a heat exchange relationship with the water in the coil instead of the water in the boiler continuing unproductively as a heat sink for the energy produced by the burner.

The second practice with a counterproductive aspect is installing a burner which is greatly oversized in relation to the amount of water required for heating all space in the house. Although allowing the temperature of the water in the boiler to catch up more rapidly to the temperature of the water in the coil for domestic use once firing of the burner does start, this arrangement has the drawback that the energy input defined in units of costly fuel oil greatly exceeds the energy output required in terms of the heat needed to raise the temperature of the water in the coil for domestic usage.

The third practice with a counterproductive aspect is that the usual temperature of the water inventoried in the jacket is maintained above the temperature found satisfactory for most domestic end uses. Normally, water at the point of exiting a facuet for domestic use is tempered by mixing it with cold water. This arrangement has the disadvantage that automatic appliances, such as dishwashers and clothes washers, utilize untempered water at a higher than required temperature, at greater cost to the homeowner, before the water reaches the low temperature start-up point.

All three practices discussed immediately hereinabove have the effect of lowering the operating efficiency of the boiler in the following ways. First, increased exposure of the heated external jacket surfaces required to contain a larger reservoir of water causes greater heat losses to the area which houses the boiler. Second, overfiring of the burner reduces the seasonal efficiency of the boiler because, due to the nature of a combustion heating system, its best efficiency is at a steady-state condition. In other words, a greater overfiring rate with respect to the space heating requirements of a house causes a lower efficiency in the operation of the boiler. Third, maintenance of unnecessarily high water temperatures inside the jacket causes increased losses to the area which houses the boiler. Fourth, the maintenance of unnecessarily high jacket temperatures also increases the rate of scale formation in the boiler, thus further reducing the operating efficiency and life of the boiler. Fifth, if the temperature is sufficiently high, a safety risk arises because the accidental use of untempered water may pose a danger of scalding to users.

Various attempts have been made in recent years to overcome these problems and to conserve energy by using socalled instantaneous or anticipatory thermostats in oil-fired water heating systems. However, many of these thermostats are intended for use in heating systems to be installed in new houses or, if intended for use in heating systems already in older houses, are complicated and require installation by skilled workers. Exemplary water heating systems employing such prior art thermostats are disclosed in U.S. Pat. Nos. 4,501,261, 4,413,775, 4,371,779, 4,354,094, and 4,166,944. Unfortunately, none of the anticipatory thermostats disclosed in these references are simple enough that they can be installed by a homeowner at great savings in skilled labor and fuel costs.

SUMMARY OF THE INVENTION

An anticipatory thermostat device is arranged in the cold water inflow pipe of a hot water heater. The device is characterized by (1) a capillary-type temperature sensing element in contact with a portion of the cold water inflow pipe in order to start the burner when the local water temperature in the cold water inflow pipe drops due to the commencement of cold water flowing through the pipe, and (2) a resistive reheating element located adjacent to the temperature sensing element which affects the rapid reset of the sensing circuit upon cessation of cold water flow.

More broadly stated, the invention is an anticipatory thermostat device applicable to any fluid heat exchanger where the rate of energy input is larger in comparison to the rate of energy output, such as any oil-fired or gas-fired furnace equipment. Also, the temperature sensing element need not be a capillary-type device.

A key advantage of the present invention is that it may be sold as a kit to a homeowner who may quickly and easily install it in the house heater by simply attaching the anticipatory thermostat to the outside of the cold water inflow pipe and connecting such anticipatory thermostat to the thermostat on the hot water tank.

BRIEF DESCRIPTION OF THE DRAWINGS

The exact nature of the invention will be more clearly understood by referring to the following detailed description of the device and its operation, the attached claims, and the several views illustrated in the drawings.

FIG. 1 shows a schematic view of the anticipatory line thermostat and a reheating element as they are embodied in a hot water heating system inside a house.

FIG. 2 shows a detailed plan view of the present invention arranged in a cold water inlet pipe.

FIG. 3 shows a cross-sectional view taken along line 3—3 in FIG. 2.

FIGS. 6-8 show various operations of a schematic electrical arrangement for connecting the anticipatory thermostat of the present invention into line with a standard boiler control which is connected at one end with the burner and at another end with the circulator pump.

DETAILED DESCRIPTION OF THE PREFERRED EMBODIMENT

Figure 4:
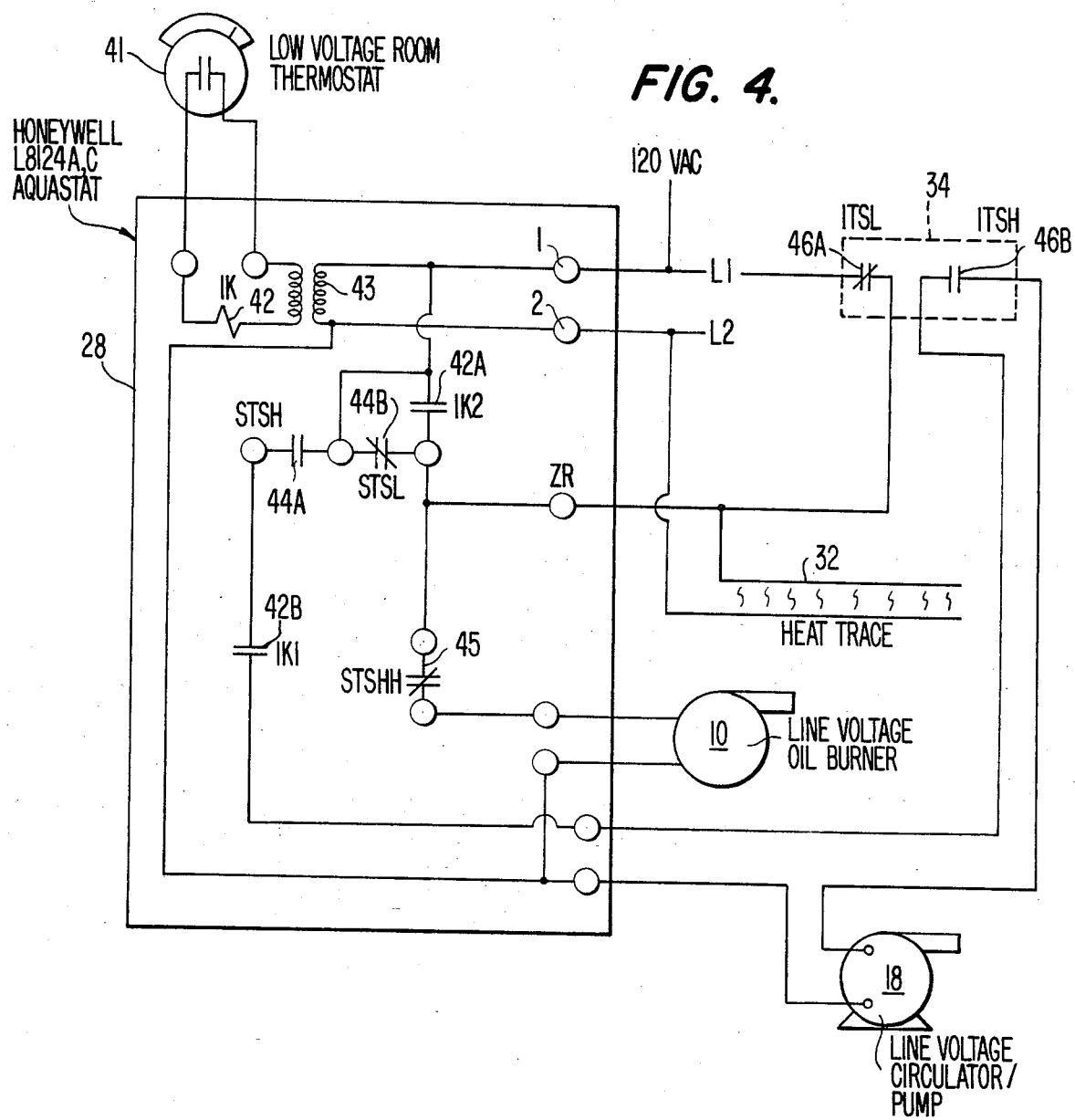
FIG. 4 shows a functional electrical arrangement for a standard boiler with the present invention incorporated therein.

As may be seen in FIG. 1, the environment of the present invention is shown. An oil-fired burner 10 supplies fuel to a combustor 12 which has a primary function of heating water contained in a storage tank 14 for circulation to baseboard radiators 16 which heat the space throughout a house. The water in the baseboard radiators 16 is returned by a circulator/pump 18 to the storage tank 14 where such water is reheated by the combustor 12.

The combustor 12 has a secondary function of indirectly heating water for domestic use. Cold water flows in a feed line 20 surrounded by insulation 22 into a heat exchanger 24 arranged inside the storage tank 14. The incoming cold water is heated while in a heat exchange relationship with the hot water inside the storage tank 14 and leaves the storage tank 14 as hot water through an outlet line 26 which leads to a bathtub, wash basin, and other facilities for domestic use of such hot water in the house.

The temperature of the water inside the storage tank 14 is regulated by a tank thermostat 28 which, upon sensing a low temperature, switches on the burner 10, and, upon sensing a high temperature, switches off the burner 10. The former condition shall hereinafter be referred to as Storage Tank Switch Low (STSL) and the latter condition, as Storage Tank Switch High (STSH).

In conventional tank thermostats, there is also a third setpoint automatically built into the unit by the manufacturer. If for some reason, the high temperature at which the burner 10 usually switches off is surpassed, the tank thermostat 28 will shut down the entire burner 10 upon sensing a very high temperature at which the boiler may become overpressurized or scalding of a domestic water user may occur. This condition shall hereinafter be referred to as Storage Tank Switch High-High (STSHH).

Referring now to FIG. 2, the details of the present invention will be described. A capillary-type temperature sensing bulb or element 30 is placed in intimate contact with the cold water inlet line 20 and, as shown in FIG. 1, is placed in close proximity, preferably within a foot, from the entrance of the cold water inlet line 20 leading into the storage tank 14.

Returning to FIG. 2, it may be seen that a resistive heating element 32, commonly known as a heat trace or a reset reheater, is placed parallel with an adjacent to the temperature sensing element 30. The length of the resistive heating element 32 is preferably about two feet. The conventional use of a heat trace is for protecting exposed pipes from freezing. In this invention, the heat trace warms up the cold water standing locally in the inlet pipe 20 near the sensing element 30.

As may be better seen in FIG. 3, the heating element 32 and the temperature sensing element 30 are secured close to the cold water inlet pipe 20 by the surrounding insulation 22 so that lengths of the heating element 32 are on opposite sides of the pipe 20 and the temperature sensing element 30 is located between the two lengths of the element 32. It is preferable that a self-limiting heat trace be used because the heat output in watts per foot of the heat trace decreases as the temperature of the element 32 increases. However, the watts per foot rating is not critical to the present invention and a nominal value of eight (8) watts per foot for surrounding a half-inch ($\frac{1}{2}$") copper pipe is satisfactory for most uses of the present invention.

Actually, the sensing element 30 is monitoring the temperature of the outside of the inlet pipe 20 which is usually made of copper. In a no flow condition, both elements 30 and 32 within the insulation 22 will reach the same temperature above the setpoint of element 34 due to the conduction of heat from the boiler via the copper pipe. When cold water enters the inlet pipe 20, the temperature of the inlet pipe 20 drops rapidly as the previously heated local water in the vicinity of the sensing element 30 is flushed away toward the heat exchanger 24. Because of the intimate contact between the incoming cold water and the pipe 20 made of copper with its excellent thermal conductive property, the change in temperature in the inlet pipe 20 occurs almost immediately and is detected by the sensing element 30 which, as shown in FIGS. 1 and 2, activates a line thermostat 34 which, as seen in FIG. 1, via a first electric line 36, switches on the tank thermostat 28 which, in turn, switches on the burner 10. The term "line thermostat" refers to the line voltage rating of the electrical contacts therein.

It is important to realize that, as best seen in FIG. 1, the heat trace represents a very small energy input compared to the heat energy removed from the water in the storage tank 14 by the flow of cold water which picks up such heat in the heat exchanger 24. As a result of this large difference in energy input and output, the temperature sensed by the element 30 cannot begin to rise again until the flow of incoming cold water stops. Although the amount involved is not significant, the heat energy emitted by the element 32 during cold water flow through the pipe 20 is not lost but contributes very slightly to the heat energy inputted to the water in the heat exchanger 24. Also, no radiant heating by the element 32 occurs because the maximum temperature that such element 32 can reach is less than 180° F.

Details of the electrical components of the present invention will now be described with reference to the control circuitry shown schematically in FIG. 4.

Control transformer 43 provides low voltage, e.g. 24 volts, for operation of the room thermostat 41. A low voltage room thermostat 41 has an internal contact which closes when the room temperature reaches the minimum set by a resident of the house. A control relay 42 acts as an isolator for the room thermostat 41 to control the line voltage thereto. A first relay contact 42A closes when the room thermostat 41 calls for heat. Upon closing, the first relay contact 42A causes firing of the burner 10 to begin. Also, the first relay contact 42A overrides STSL circuit 44B for the burner 10. A second relay contact 42B also closes when the room thermostat 41 calls for heat. Upon closing, the second relay contact 42B starts the operation of the circulator/pump 18.

The STSHH circuit 45 opens to stop operation of the burner 10 when the water in the storage tank 14 reaches a desired maximum temperature. The STSH circuit 44A opens to prevent operation of the circulator/pump 18 when the water in the storage tank 14 is not sufficiently hot for domestic hot water usage. The STSL circuit 44B is the normal control for the burner 10 and opens when the water in the storage tank 14 has reached a normally high temperature for use. The STSL circuit 44B closes to start operation of the burner 10 when the temperature of the water in the storage tank 14 falls below the lowest desirable temperature for use.

STSHH circuit 45 opens when the water in the storage tank 14 reaches the maximum safe temperature. The STSHH circuit 45 overrides all other controls on the burner 10 and cuts off the burner 10 when such maximum safe temperature is achieved.

The line thermostat 34 has two main electrical components. An ITSL (inlet temperature switch low) circuit 46A has a contact which closes when the temperature measured by the sensing element 30 in FIGS. 1–3 falls below its setpoint due to the flow of cold water into the pipe 20. Upon closing of the contact, the ITSL circuit starts anticipatory firing of the burner 10 and also starts the operation of the reheating element 32 surrounding the pipe 20. An ITSH (inlet temperature switch high) circuit 46B has a contact which opens when the temperature measured by the sensing element 30 falls to a minimum due to the flow of cold water into the pipe 20. Upon opening of the contact, the ITSH circuit 46B prevents operation of the circulator/pump 18 through the line 38 shown in FIG. 1. After the flow of cold water through the inlet pipe 20 ceases, the ITSH circuit 46B closes as the fresh cold water in the inlet pipe 20 is being heated by the reheating element 32.

In FIGS. 5–8 which will be discussed next, live circuits through which electricity is flowing are denoted by thick black lines and circuits through which no electricity is currently flowing are denoted by thin black lines.

It is important to note that both temperature and relay contacts are shown in the room temperature state, as is the industry convention. The use of the thick and thin line thicknesses should serve to provide the necessary clarification in FIGS. 5–8.

FIG. 5 represents the steady-state condition when there is no demand from either the room thermostat 41 or the temperature sensing element 30. The storage tank 14 is hot; thus, STSH 44A is closed and STSL 44B is open, the burner 10 is off, and the heat trace or reset reheater 32 is also off.

When a demand for domestic water use begins by, for example, a resident turning on the shower faucet, heated water is withdrawn through the outlet pipe 26, as shown in FIG. 1, and an equal flow of cold water enters the inlet line 20. As the locally heated water standing in the inlet line 20 near the temperature sensing element 30 is flushed away into the heat exchanger 24, the temperature sensed by the element 30 drops rapidly to ITSL, thus anticipatorily starting the firing of the burner 10. At this point, the conditions shown in FIG. 6 exist for the electric circuitry.

Returning to FIG. 1, the burner 10 continues to fire the combustor 12 as long as cold water flow is maintained from the inlet pipe 20 into the heat exchanger 24, provided the water in the storage tank 14 does not become so high that the STSHH condition is reached.

Figure 7:
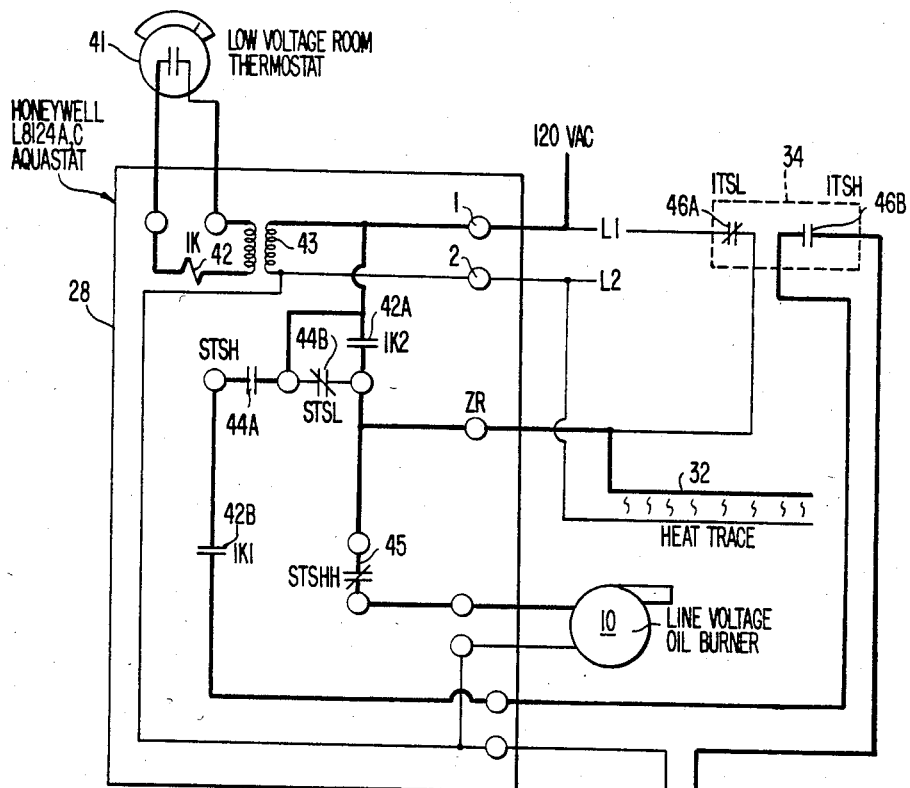

FIG. 7 represents the condition where the room thermostat 41 is responding to a space heating requirement while no domestic water is being used. The ITSL-/ITSH element 34 is unaffected; however, relay contact 42A is closed due to closure of the thermostat 41. The closure of relay contact 42A causes the heat trace 32 to become energized, thus warming the domestic inlet pipe 20 of FIG. 2 above its normal shut off point.

A subtle advantage results as subsequent firing of burner 10 for domestic water usage is delayed slightly due to the initially elevated temperature of sensing element 30 of FIG. 2 at the start of the cold water entry into inlet pipe 20. This sequence prevents unnecessary firings of burner 10 for small domestic water flows when the inventory in the storage tank 14 of FIG. 1 has recently received an energy input due to space heating requirements. At this point, the inventory of water in the storage tank 14 is at or near the maximum permitted by STSHH 45, due to the bypassing of the normal setpoint STSL 44B by element 42A during space heating.

Figure 8:
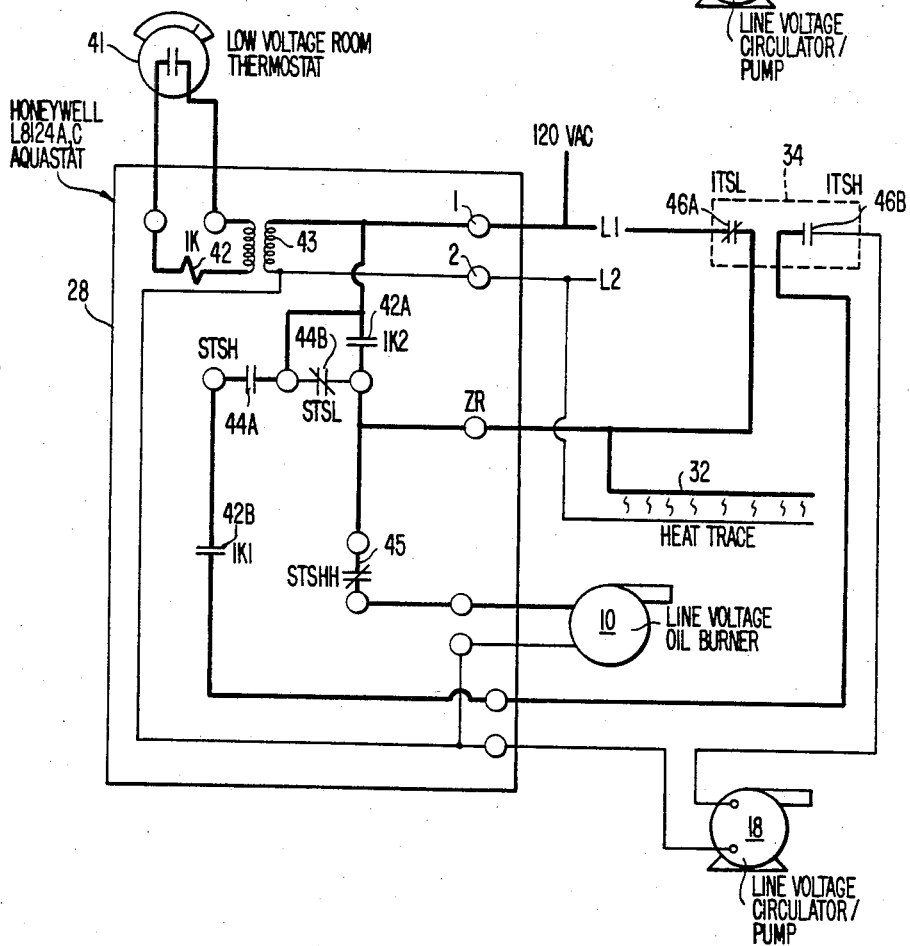

FIG. 8 represents a condition where both domestic water and space heating are required. In order to prevent the circulator/pump 18 from withdrawing hot water from the storage tank 14, thus reducing the amount of hot water available for heating the water for domestic use in the heat exchanger 24, the line thermostat 34 opens a second electric line 38 to prevent the circulator/pump 18 from operating until the demand for domestic hot water ceases. When such demand finally ends, the reheater 32 in FIG. 2 causes the temperature of the freshly stopped cold water in the inlet line 20 to start to rise above the ITSL. Also, the circulator/pump 18 is turned on if the temperature of the rooms in the house has remained too low. Thus, at this point, the conditions shown in FIG. 7 for the electric circuitry again exist. When such demand for domestic hot water ceases, the temperatures of the water in the storage tank 14 is usually above STSL and the burner 10 is still on because it is being energized by the line thermostat 34 which is responding to the ITSL condition. The burner 10 continues to operate until the temperature measured by the sensing element 30 in regard to the freshly stopped local water in the inlet pipe 20 rises to the ITSH condition which cuts off firing of the burner 10.

It should be noted that the water in the inlet pipe 20 is also somewhat warmed by conduction from heat emitted outwardly through the storage tank 14, in addition to being warmed primarily by the reheater 32. Because the mass of cold water standing still in the inlet pipe 20 near the reheater 32 and the temperature sensing element 30 is small, such mass is heated fairly quickly until the ITSL 46A circuit opens. When the ITSH condition is reached, the burner 10 is turned off and the reheater 32 is also turned off, thus returning the control circuitry to the initial conditions shown in FIG. 5.

During warm seasons when the house heater is not operating and the circulator/pump 18 is turned off completely the condition shown in FIG. 6 will exist for the electric control circuitry whenever there is a demand for domestic water usage.

During cold seasons when the temperature of the water in the storage tank 14 is at the STSL condition, the burner 10 is being operated by signals triggered usually by the STSL condition, and sometimes by the ITSL condition when there is a demand for domestic water usage. During such cold seasons, even if the reheater 32 operates long enough to cause the temperature of the water in the inlet line 20 to rise above the ITSL condition so that a signal is no longer sent by the line thermostat 34 to the burner 10, the burner 10 will continue to operate until the temperature of the water in the storage tank 14 rises above the STSL setpoint and will shut off only when the STSHH setpoint is reached if thermostat 41 requests heat. Up until the point where the reheater 32 stops operating, the heat output of the reheater 32 decreases as the temperature of the small mass of water in the inlet pipe 20 rises due to the self-limiting nature of the heat trace 32 which causes a decrease in output watts as the temperature of the material rises.

The improved response of the burner 10, as evoked by the present invention, will permit elimination of a number of conventional counterproductive practices now generally employed to alleviate problems associated with existing burner control devices. Thus, this invention significant economic benefits in terms of better fuel consumption, improved boiler efficiency, reduced scale formation, and lower capital costs for new installations.

The resultant ability of an installer to properly size the water storage tank 14 for the space heating requirements of a house will reduce the number of on-off cycles of the burner 10. This reduction will necessarily extend the useful life of the burner 10.

In the existing control systems, the present invention requires no changes, except for the electrical connection to the tank thermostat 28. In new control systems, the additional capital cost over conventional capital cost in low, e.g. about 4% or less. However, this additional capital cost should be more than offset by a reduced capital cost due to the use of a small water storage tank 14.

Returning to existing control systems, it may be seen that the present invention may be readily retrofitted into existing equipment quite easily by unskilled labor or by the homeowner.

The efficiency of the burner 10 is increased by lowering the number of times that the burner 10 is fired, principally due to the overfire rate reduction as a result of the better domestic water temperature control. As previously stated, boiler efficiency is highest when the lowest firing rate (gal./hr.) is utilized. This invention allows the firing rate to be sized for space heating requirements rather than domestic water needs. In addition to the economic savings obtained by such efficiency, the ability of the burner 10 to maintain a more constant temperature of the water in storage tank 14 is another important advantage when the heated water is used for domestic purposes, particularly for personal cleaning. Another advantage is that any failure of the present invention would not impair the safety of domestic users due to water approaching scalding temperatures. Nevertheless, in all cases, any failure would be highly unlikely because of the simplicity and passivity of the present invention.

The use of a capillary-type bulb for the temperature sensing element 30 to be used in already manufactured boiler control systems is preferred. The prior art boiler control devices used for sensing the temperature of the jacket surrounding the water storage tank 14 are such that no mixing of technology is required if the present invention is to be used in conjuction with such prior art boiler control devices.

In the event that the primary boiler control for future residential heating units introduce electronic sensing devices, e.g. thermocouples or Resistive Temperature Detectors (RTDs), the sensing element 30 on the inlet pipe 20 could be replaced with a RTD or the like, as long as the response of such an electronic device is at least equivalent to the capillary-type bulb. It is important, however, not to provide an electronic device too extremely sensitive because it is desirable to avoid short and excessively frequent on-off cycles of the burner 10 that would unnecessarily result from numerous uses of domestic water for very short durations.

The use of the self-limiting heat trace is ideal for the reheating element 32 because it is intrinsically safe and is available with ratings varying from four watts per foot to 32 watts per foot. Although a nominal rating of eight watts per foot is preferred for the present invention, a heat trace having a rating of 16 watts per foot would result in a faster resetting of the reheating element 32. The watt rating refers to the output when cold and decreases with increasing temperature.

The anticipatory initiation of the firing of the burner 10, based upon the detection of cold water flow in the inlet pipe 20 in response to demands for domestic hot water, is believed to be new. The sensing of hot water usage by monitoring the temperature of a small thermal mass of unheated water which passes rapidly through the inlet pipe 20 is believed to be new. If the water in the inlet pipe 20 is cold, the response of the present invention is rapid and the time for the response is adjustable by changing the setpoint of the ITSL circuit 46A in the line thermostat 34. This adjustment provides a simple means of accommodating variations in incoming water temperature and the size of the originally installed boiler/burner plant. It is also of interest and advantageous that the response of the invention is more rapid as the incoming water temperature decreases.

The use of an ancillary device, i.e. the reheating element 32, to affect the rapid resetting of the line thermostat 34 upon cessation of domestic water usage is believed to be new. This invention avoids the unnecessary continued firing of the burner.

Oil-fired hydronic heating systems are in widespread use. The ease of retrofitting such heating systems already installed in older houses greatly increases the applicability of the present invention because all prior installations could potentially benefit from incorporation of the present invention therein. As to new houses, the inclusion of the present invention into new heating systems would involve very little additional cost. Due to the currently high cost of house heating oil, any incremental increase in the efficiency of the burner helps save a significant amount of money over the life of the system.

I claim:

1. In a hot water heating system having
   a hot water storage tank;
   a combustor arranged inside the hot water storage tank;
   a burner means, connected to the hot water storage tank, for firing the combustor;
   a plurality of radiators connected to the hot water storage tank;
   a pump means, arranged in line with the plurality of radiators, for circulating hot water from the hot water storage tank, through the plurality of radiators, and back to the hot water storage tank;
   a tank thermostat means having a high temperature limit, a low temperature limit, and a safety limit which exceeds said high temperature limit, arranged on the hot water storage tank and connected to the burner means, for measuring the temperature of the hot water in the hot water storage tank and for controlling the burner means in response to said temperature of the hot water;
   a heat exchanger arranged inside the hot water storage tank;
   a cold water inlet line connected to one end of the heat exchanger; and
   a hot water outlet line connected to an opposite end of the heat exchanger;
   an improvement comprising:
   means, arranged around a portion of the cold water inlet line, for heating cold water in said portion of the cold water inlet line;
   means, arranged in close proximity to the heating means around said portion of the cold water inlet line, for sensing the temperature of the cold water in said portion of the cold water inlet line; and
   a line thermostatic means, connected at one side to the temperature sensing means and connecting at another side to the tank thermostatic means, for anticipatorily controlling firing of the combustor by the burner means via the tank thermostatic means upon the sensed flow of water through the cold water inlet line and maintaining said firing for as long as the cold water flows or until the safety limit is reached.

2. In the hot water heating system according to claim 1, the improvement further comprising:
   electrical line means, connected at one end to the line thermostatic means and at an opposite end to the pump means, for shutting off said pump means when said line thermostatic means is causing firing of the combustor by the burner means via the tank thermostatic means.

3. In the hot heating system according to claim 1, the improvement further comprising:
   insulation means, arranged around the cold water inlet line, for securing the cold water heating means and the temperature sensing means in close proximity to the cold water inlet line.

4. In the hot water heating system according to claim 1, in the improvement thereof, wherein:
   said cold water heating means is a resistive heat trace.

5. In the hot water heating system according to claim 1, in the improvement thereof, wherein:
   said temperature sensing means is a capillary-type bulb.

6. In the hot water heating system according to claim 1, in the improvement thereof, wherein:
   said low temperature limit and said high temperature limit of
   said line thermostatic means includes an inlet temperature switch low circuit and an inlet temperature switch high circuit, respectively.

* * * * *